United States Patent [19]

Nelson et al.

[11] Patent Number: 5,222,698

[45] Date of Patent: Jun. 29, 1993

[54] CONTROL OF BOUNDARY LAYER FLOW

[75] Inventors: Philip A. Nelson; Michael J. Fisher; Jean-Luc Rioual, all of Southampton, England

[73] Assignee: Rolls-Royce plc, London, England

[21] Appl. No.: 923,491

[22] Filed: Jul. 31, 1992

[30] Foreign Application Priority Data

Oct. 10, 1991 [GB] United Kingdom ............... 9121455

[51] Int. Cl.⁵ .............................................. B64C 21/06
[52] U.S. Cl. .................................... 244/203; 244/209; 244/130
[58] Field of Search ............. 244/203, 207, 208, 209, 244/130; 73/861.18, 861.71, 861.66, 432.1, 204.18

[56] References Cited

U.S. PATENT DOCUMENTS 3,362,663 1/1968 Wehrmann ...................... 244/130
3,951,360 4/1976 Anxionnaz .................... 244/209
4,516,747 5/1985 Lurz .............................. 244/130
4,749,150 6/1988 Rose et al. .................... 244/209
4,936,146 6/1990 Stack et al. ................... 244/203
5,114,103 5/1992 Coffinberry ................... 244/209

OTHER PUBLICATIONS

"Lamina Flow a Reality", *Flight International* May 15, 1982, p. 1208.

Primary Examiner—Galen Barefoot
Attorney, Agent, or Firm—Cushman, Darby & Cushman

[57] ABSTRACT

Turbulence in the boundary layer of a flow of air across a surface is controlled by sucking air from the surface. A plurality of turbulence detectors are located in the surface downstream of apertures provided in the surface. The apertures are connected to a suction pump. Air is sucked through the apertures until the air flow of the most downstream of the detectors is non-turbulent.

8 Claims, 3 Drawing Sheets

CONTROL OF BOUNDARY LAYER FLOW

The invention relates to boundary layer flow and is specifically concerned with the control of that boundary layer flow.

The manner in which a fluid flows across a surface can have an important effect upon the operational efficiency of the structure which defines that surface. If the flow of fluid immediately adjacent the surface, that is, the boundary layer, is substantially laminar, then the fluid drag provided by the surface is low. However, if the boundary layer becomes turbulent, then that drag increases. Clearly such drag is important if, for instance, the structure defining the surface is travelling through the fluid. The higher the drag, the greater the energy required to propel the structure through the fluid at a given speed.

An example of a structure whose operational efficiency is clearly influenced by drag is the nacelle of a gas turbine engine. The nacelle encloses the engine and is normally positioned externally of the aircraft which its engine powers. As the aircraft is propelled through the atmosphere by the engine, usually with other similar engines, air flows over the external surface of the nacelle. If that airflow is substantially laminar then the drag provided by the nacelle is low. However if the airflow becomes turbulent, the nacelle drag increases. This results in turn in the engine having to provide more power, and therefore consume more fuel, in order to maintain a given aircraft speed.

It is an object of the present invention to provide a way of controlling the boundary layer flow of a fluid across a surface to substantially avoid drag-inducing turbulence in that flow.

According to the present invention, there is provided a structure which defines a surface across which, in operation, there is a fluid flow, said surface having a plurality of apertures therein which are interconnected with suction means, and a plurality of detectors adapted to detect turbulent flow in the boundary layer of said fluid flow adjacent said surface, said plurality of detectors being so positioned as to be sequentially exposed to said fluid flow downstream of at least some of said plurality of apertures, and control means adapted to control the suction of said suction means in accordance with the outputs of said turbulent flow detectors said control means being so arranged that said suction means is operated to suck said fluid through said apertures to an extent sufficient to substantially eliminate turbulent flow in said boundary layer of said fluid flow over the most downstream of said detectors but not over the most upstream of said detectors.

The present invention will be described, by way of example, with reference to the accompanying drawings in which.

Figure 1:
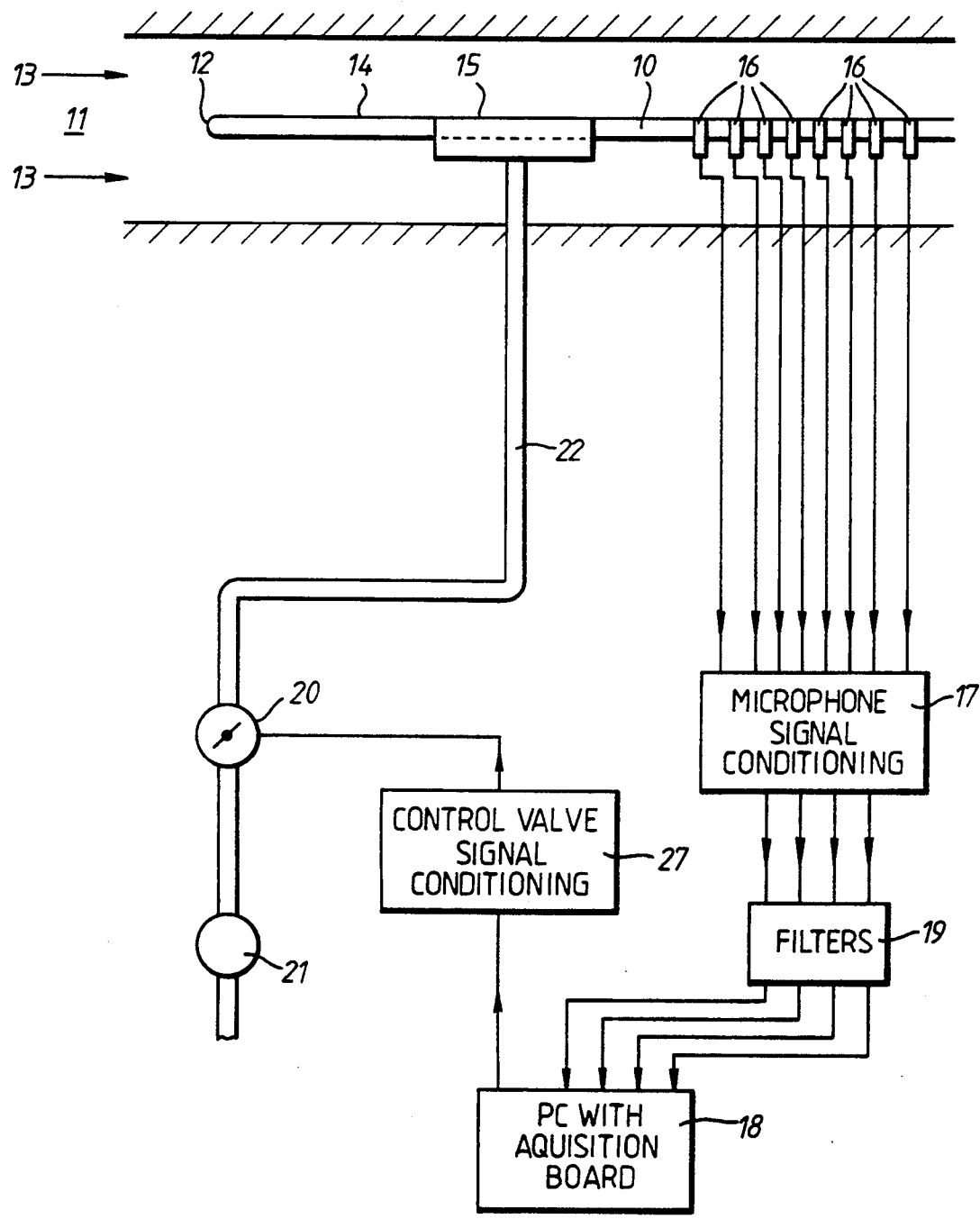
FIG. 1 is a schematic view of a test structure having a boundary layer flow control device in accordance with the present invention.

Referring to FIG. 1, a test structure 10 is positioned in a wind tunnel 11. The test structure 10 is in the form of a flat plate having an aerodynamic leading edge 12. The air flow through the tunnel 11 is in the general direction indicated by the arrows 13 so that some of the air flow passes across the upper surface 14 of the test structure 10.

Downstream of the leading edge 12 and flush with the surface 14 there is provided a suction panel 15, the structure of which will described later in greater detail. Downstream of the suction panel 15 and also flush with the surface 14 there are provided a number of turbulence detectors 16. Each of the turbulence detectors 16 is in the form of an electret microphone although it will be appreciated that other suitable forms of detector could be used if so desired.

The outputs of the electret microphones 16 are directed to a signal conditioning unit 17 and then to a personal computer 18 having a special purpose analogue acquisition board via filters 19. The output from the personal computer 18 is then suitable conditioned to electrically operate the input control valve 20 of a centrifugal pump 21.

The centrifugal pump 21 is interconnected with the suction panel 15 via an interconnecting pipe 22.

Figure 2:
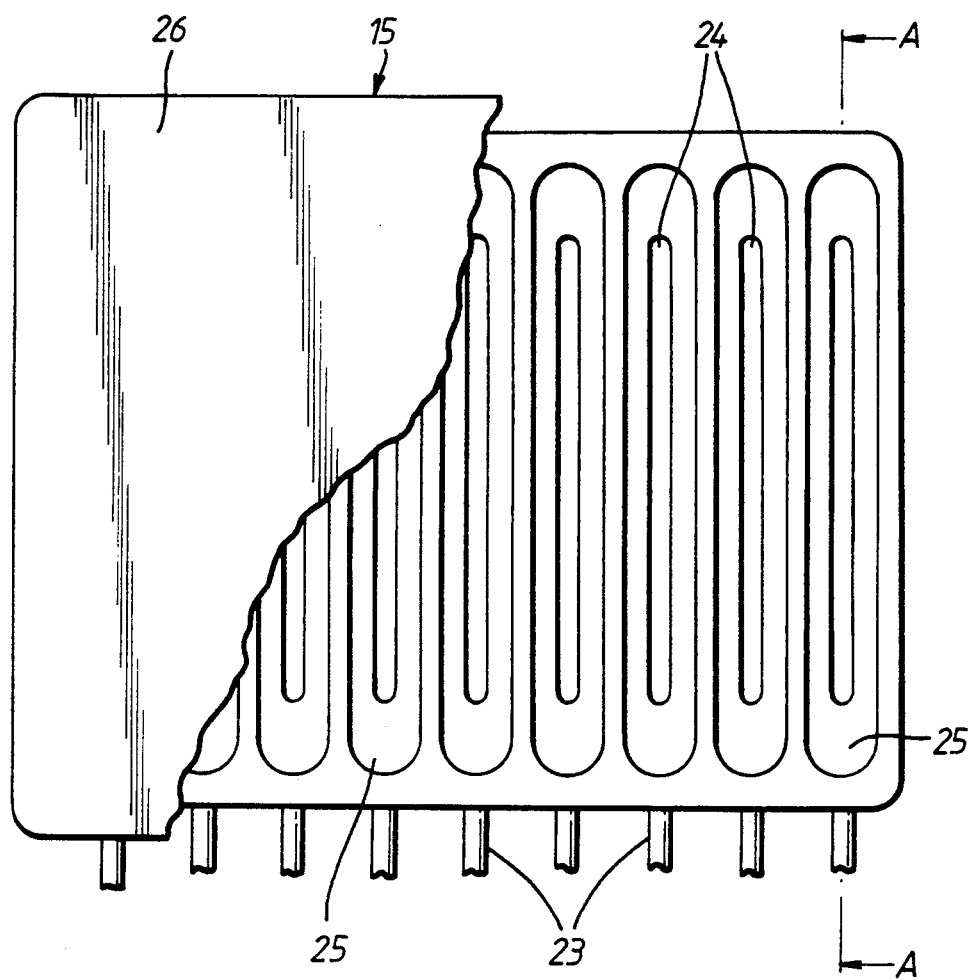
FIG. 2 is a partially broken away plan view of a part of the surface of the structure shown in FIG. 1.
Figure 3:
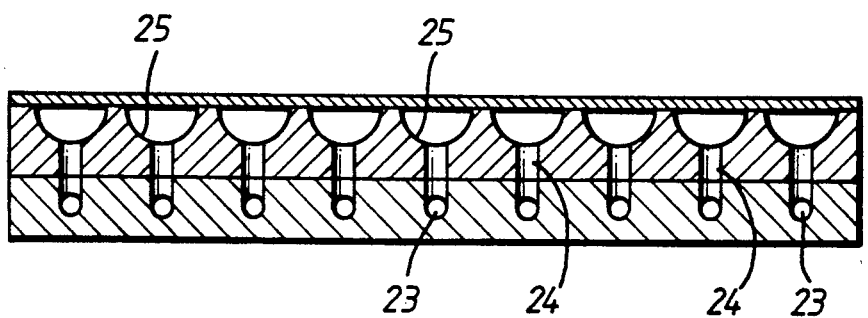
FIG. 3 is a view on section line A—A of FIG. 2.

The pipe 22 is connected to a plurality of manifolds 23 positioned on the underside of the suction panel 15 as can be seen in more detail in FIGS. 2 and 3. Each manifold 23 is in communication with a slit 24 in the panel 15. Each slit 24 is in turn in communication with a channel 25 in the upper surface of the panel 15. The slits 24 and channels 25 are parallel with each other and extend substantially normal to the direction of air flow 13 across the panel 15. All of the channels 25 are covered by a sheet 26 having a large number of very small (approx. 0.1 mm diameter) holes in it.

It will be seen therefore that the control valve 20 serves to regulate the amount of suction present at the surface of the suction panel 15 provided by the operation of the centrifugal pump 21.

That suction serves to suck into the pipe 22 some of the boundary layer of the air flow passing across the panel 15.

In the event that the boundary layer air flow over the microphone 16 is turbulent, the microphones 16 direct an appropriate regional to the signal conditioning unit 17. The conditioned signal is then directed to the PC18 via the filters 19. The PC18 then provides an output signal which is conditioned by the unit 27 to operate the valve 20 and thereby provide suction at the panel 15. That suction is progressively increased until a situation is reached in which the most upstream of the microphones 16 detect turbulent flow but the most downstream detect laminar flow.

The control system defined by the microphones 16, signal conditioning unit 17, filters 19, PC18 unit 27 and the valve 20 thereby ensures that only sufficient suction is applied at the suction panel 15 as is necessary to ensure that localised turbulence in the boundary layer is suppressed. Consequently only the minimum amount of energy is expended in suppressing the turbulent flow, thereby maximising the efficiency of the total system.

In order to demonstrate the effectiveness of the present invention, a series of tests were carried out. In these tests, the microphones 16 were respectively positioned at 0.77 m, 0.79 m, 0.805 m, 0.835 m, 0.85 m, 0.865 m and 0.885 m from the leading edge 12.

The microphones 16 were calibrated in order to ensure that the voltages acquired by the PC 18 were the same for a given magnitude of pressure fluctuation. The microphone 16 signals were high pass filtered using Kemo type VBF/8 filters 19 with a decay of 48 dB/octave and cut-off frequency of 800 Hz. No low pass filtering was used. The output voltages produced by four conditioned microphone signals were acquired by the PC 18 equipped with the special purpose analogue acquisition board which sampled the signals at a rate of 4 kHz. Signals were acquired during a time interval T and the rms value of the signals was calculated from these date samples. These results were than normalised by the rms value of the measured microphone 16 output voltages produced by the turbulent boundary layer in the absence of suction. Thus the output of a microphone 16 in the laminar region yielded a value close to 0 whilst a microphone in the turbulent region yielded a value close to 1. In the transition region either value could be produced depending on the acquisition time T. Thus the vector y(k) of the control system of the device of the present invention in FIG. 4 is given by $$y(k) = [y_1(k)\ y_2(k)\ y_3(k)\ y_4(k)] \quad (1)$$

where $y_m(k)$ is the normalised rms pressure at the m'th microphone at the k'th control cycle. This is calculated from $$y_m(k) = \frac{\left[\frac{1}{N}\sum_{n=0}^{N-1} p_m^2(n)\right]^{\frac{1}{2}}}{P_{turb}} \quad (2)$$

and $p_m(n)$ is the value of the m'th microphone signal at the n'th sample. The value of $P_{turb}$, the rms value of the microphone signal due to the turbulent boundary layer was calculated from a long time average. The number of samples N was determined by the acquisition time T and the sampling frequency, and thus N = 4000 T in the case described here.

Figure 4:
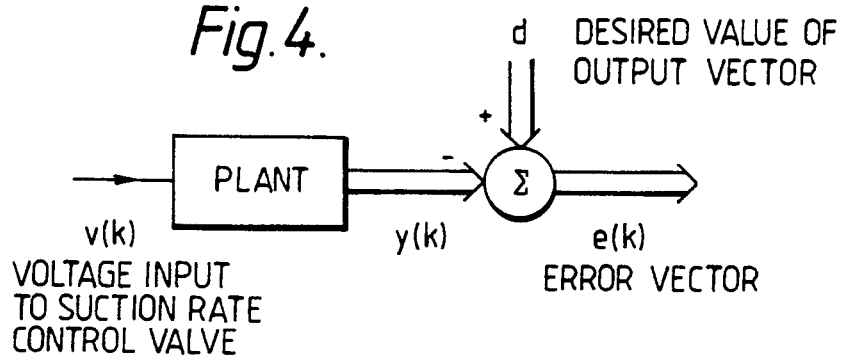
FIG. 4 is a block diagram of the control system for the device shown in FIG. 1.

As shown in the block diagram of FIG. 4 the vector y(k) was compared with a reference vector d, for the four microphones 16 used was defined by $$d = [0\ 0.33\ 0.66\ 1] \quad (3)$$

The four microphones 66 used were as previously stated placed respectively 0.77 m, 0.79 m, 0.82 m and 0.835 m downstream of the leading edge of the plate. The control system thus attempted to ensure that the suction rate at the panel 15 was maintained at a value which held the transition region between the first and fourth microphones 16. An error signal was generated by comparing the vector y(k) with the vector d after each acquisition cycle. Thus the error vector is defined by $$e(k) = d - y(k) \quad (4)$$

In addition, a single measure of the departure of state of the boundary layer from its desired condition is given by the scalar value e(k) found by adding the elements of the vector e(k).

Figure 5:
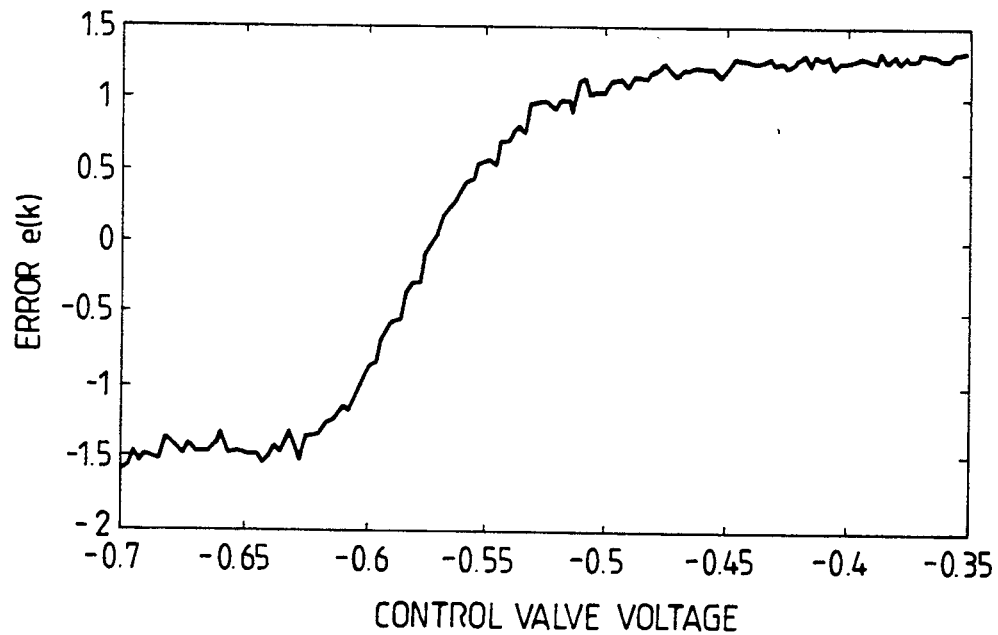
FIG. 5 is a graph indicating the manner of operation of the device shown in FIG. 1.

FIG. 5 shows the evolution of this error e(k) with the control valve 20 voltage. The maximum value of +1.5 corresponds to a totally laminar air flow boundary layer in the region of the four microphones and the minimum error of −1.5 corresponds to an almost totally turbulent air flow boundary layer.

The purpose of the control system is therefore to maintain the value of the error signal near zero, a positive error resulting in a decrease of the suction rate at the panel 15 and a negative error resulting in an increase of the suction rate at the panel 15. In order to achieve control an odd function of the error is multiplied by a coefficient such that the next input voltage of the control valve 20 is determined by $$v(k+1) = v(k) + \mu f(e(k)) \quad (5)$$

The control cycle executed thus involves the acquisition of the signals, computation of the error e(k) and subsequent modification to the control valve 20 input voltage in accordance with equation (5). A delay of 0.4 s is then allowed (due to the intrinsic lag in the system established from a measurement of its transient response) before the next acquisition of the microphone 16 signals.

It will be seen therefore that the present invention provides an effective way of substantially reducing turbulence in the boundary layer flow across a surface. This in turn results in a reduction in the aerodynamic drag provided by that surface.

Although the present invention has been described with reference to a structure in which the electret microphones 16 are downstream of the suction panel 15, this need not necessarily be essential to the effective operation of the present invention. Thus, for instance, the microphones 16 could be located on the suction panel 15 itself. Moreover it will be appreciated that the suction at the panel 15 could be applied by means other than a centrifugal pump 21. For instance, the centrifugal pump 21 could be replaced by another type of pump or indeed by a region which is at a lower pressure than that of the air flowing over the panel 15. Thus the term "suction pump" used in this specification is intended to embrace these alternatives.

The present invention could therefore be applied to such components as aircraft engine nacelles in order to reduce the aerodynamic drag of those nacelles. However it will be appreciated that it could also be applied to other structures defining surfaces across which there is a fluid flow. In all cases, the fluid could be gaseous or liquid.

Figure 6:
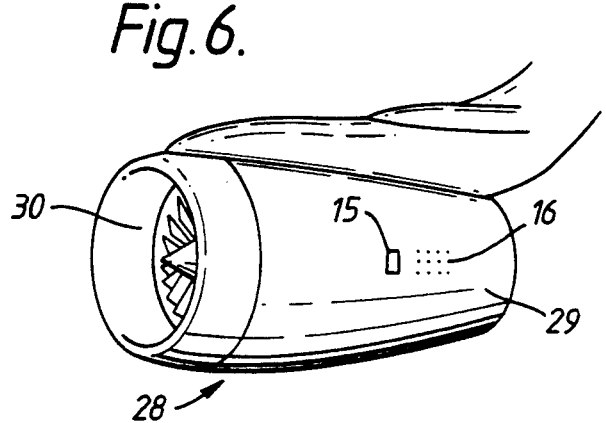
FIG. 6 is a view of an aircraft engine nacelle incorporating a boundary layer flow control device in accordance with the present invention.

In the case of an aircraft engine nacelle, 28 the panels 15 and microphones 16 are located at appropriate positions on the nacelle exterior 29 as can be seen in FIG. 6. The positions chosen are those at which turbulent laminar flow is likely to occur. Typically these positions are located in the region between 40 and 70% of the nacelle length from the nacelle intake 30. Although only one panel 15 and its associated microphones 16 are shown on the nacelle 28, it will be appreciated that they will in fact be a number of panels 15 and microphones 16 on the nacelle.

We claim:

1. A structure which defines a surface across which, in operation, there is a fluid flow, said surface having a plurality of apertures therein which are interconnected with suction means wherein a plurality of detectors are provided which are adapted to detect turbulent flow in the boundary layer of said fluid flow adjacent said surface said plurality of detectors being so positioned as to sequentially exposed to said fluid flow downstream of at least some of said plurality of apertures, and control means adapted to control the suction of said suction means in accordance with the outputs of said turbulent flow detectors, said control means being so arranged that said suction means is operated to suck said fluid through said apertures to an extent sufficient to substantially eliminate turbulent flow in said boundary layer of said fluid flow over the most downstream of said detectors but not over the most upstream of said detectors.

2. A structure as claimed in claim 1 wherein said apertures are slits generally normal to the direction of flow of said boundary layer.

3. A structure as claimed in claim 2 wherein said slits are covered by a perforated sheet.

4. A structure as claimed in claim 3 wherein the perforations in said sheet are each of approximately 0.1 mm diameter.

5. A structure as claimed in claim 1 wherein each of said turbulent flow detectors (16) is an electret microphone.

6. A structure as claimed in claim 1 wherein said suction pump is a centrifugal pump.

7. A structure as claimed in claim 1 wherein said structure is an aircraft engine nacelle.

8. A structure as claimed in claim 7 wherein said apertures and detectors are located in regions which are between 40 and 70% of the length of said nacelle from its air intake.

* * * * *